Oct. 7, 1958

R. V. LESOVSKY 2,855,151

MIXING VALVE

Filed March 23, 1955

INVENTOR.
Rodin V. Lesovsky
BY

HIS ATTORNEY

United States Patent Office 2,855,151
Patented Oct. 7, 1958

2,855,151

MIXING VALVE

Rodin V. Lesovsky, Inglewood, Calif., assignor to Robertshaw-Fulton Controls Company, Greensburg, Pa., a corporation of Delaware Application March 23, 1955, Serial No. 496,136

8 Claims. (Cl. 236—12)

This invention relates to thermostatically controlled fluid mixing valves and more particularly to devices of this character for mixing hot and cold water and delivering hot water or a tempered water at a predetermined intermediate temperature.

The use of automatic domestic appliances has created a demand for a special high temperature water supply. This high temperature water, while necessary for the operation of these appliances, would be very dangerous if supplied to the common hand basins and other faucets. Thus, a special device interposed between the aforementioned faucets and the high temperature water supply to temper the water to reasonable temperature is obviously necessary from the standpoint of safety and practicality.

In previous devices of this character, cold water is mixed with hot water to create an outlet supply of tempered water. Control of the flow has been attained two ways. In one, the hot and cold inlets have each been provided with a valve, so that one may be closed as the other is opened. In the other case, a valve has been provided in only one inlet. To cause flow through the single valve, one must provide that the pressure of the fluid from the other inlet is lower than that from the valve inlet. This has usually been done by restricting the flow through one inlet.

In normal poppet valve operation, it is difficult to obtain a low pressure region close to the valve without erratic pulsing and inefficient operation of the valve. Thus, it has been difficult to obtain proper mixing in a single valve type of mixer. Since the single valve type of unit is the most economical and would appeal more to the average user, it has been proposed to improve some of its features to produce a single valve type mixing valve that is comparable to the double valve type in operation but having a low cost and simplicity of construction.

It is an object of this invention to controllably mix high temperature and low temperature fluid in such a manner as to result in the outflow of a controlled tempered supply of fluid.

Another object of this invention is to incorporate in a mixing valve an improved valve design that permits large flow at low valve lift.

Another object of this invention is to establish a turbulent low pressure region near the valved inlet with less resultant energy loss.

In the preferred embodiment of this invention, a casing is provided with a mixing chamber having an inlet and outlet for fluid and a second chamber surrounding said mixing chamber but separated therefrom by a hollow cylindrical valve member, said valve member being movable between controlling positions in response to temperature variations of the fluid in said mixing chamber to allow flow of fluid from said second chamber to said mixing chamber when in one of said controlling positions. Means are provided within said mixing chamber for producing a pressure drop and turbulence in the fluid flowing therethrough.

Other objects and advantages will become apparent from the following description taken in connection with the accompanying drawing wherein.

Figure 1:
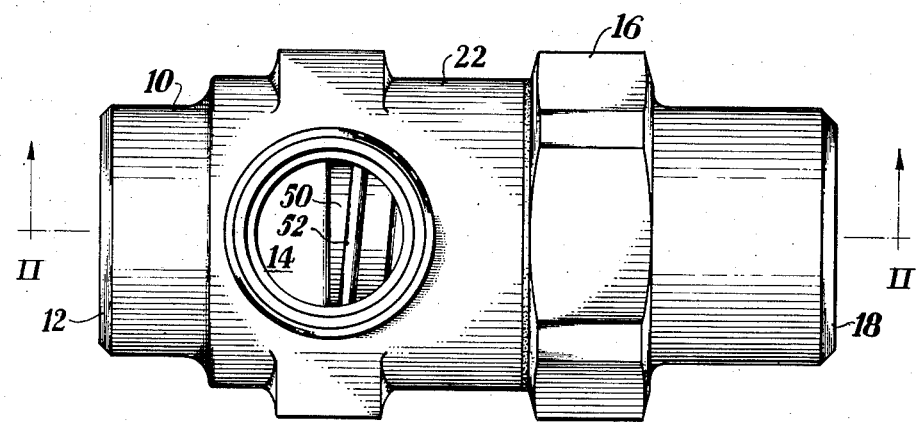
Fig. 1 is a front elevational view of a mixing valve embodying this invention.
Figure 2:
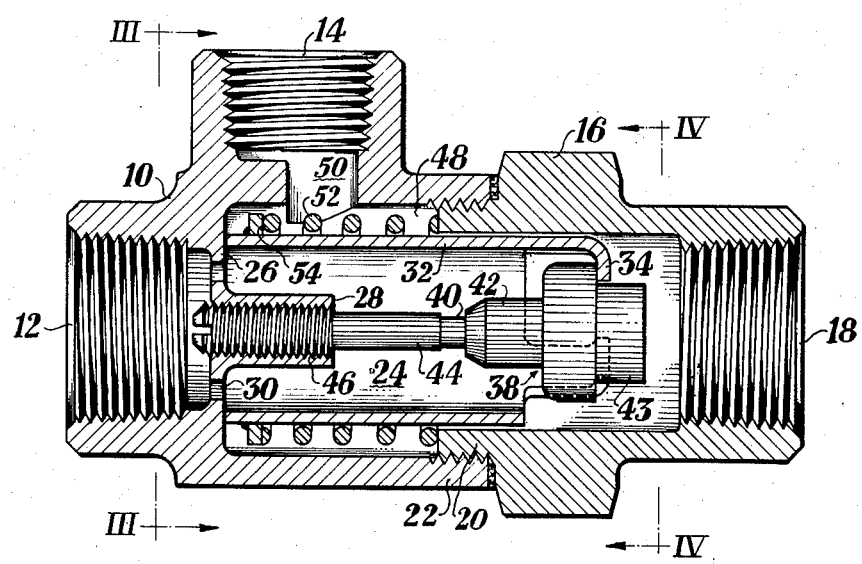
Fig. 2 is a section taken on the line II—II of Fig. 1.
Figure 3:
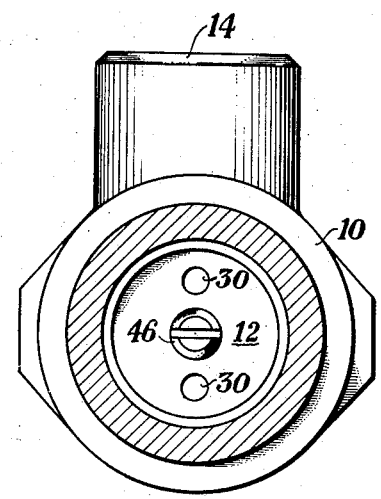
Fig. 3 is a section taken on the line III—III of Fig. 1.
Figure 4:
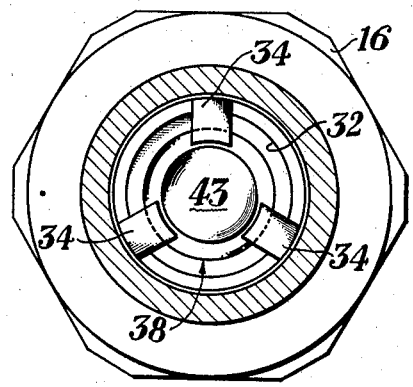
Fig. 4 is a section taken on the line IV—IV of Fig. 1.

Referring more particularly to the drawings, the mixing valve includes a main casing 10 provided with an inlet 12 for hot fluid and an inlet 14 for cold fluid, and having an end casing 16 with an outlet 18 for tempered fluid. The end casing 16 is detachably secured to the main casing 10 by an end portion 20 threaded for reception in an internally threaded portion 22 of the main casing 10.

When the end casing 16 is detachably secured to the main casing 10, the hot fluid inlet 12 is axially aligned with the tempered fluid outlet 18. A cylindrical mixing chamber 24 is provided by the main casing 10 and the end casing 16 and axially aligned with the hot fluid inlet 12 and the tempered fluid outlet 18. The cold fluid inlet 14 in the main casing 10 has an axis perpendicular to the axis defined by the hot fluid inlet 12 and the tempered fluid outlet 18.

A wall 26 of the main casing 10 is formed across the hot fluid inlet 12 and has an internally threaded tubular portion 28 extending perpendicularly therefrom and into the mixing chamber 24. The tubular portion 28, having a longitudinal axis coinciding with the axis established by the hot fluid inlet 12 and the tempered fluid outlet 18, is adapted to receive a threaded adjusting element later to be described. The wall 26 is provided with a plurality of orifices 30 (in this instance two) which are equally spaced to define an axis which coincides with the axis defined by the hot fluid inlet 12 and the tempered fluid outlet 18. Hot fluid entering through the inlet 12 will flow through the orifices 30 and into the mixing chamber 24. The orifices 30 cause turbulence and a pressure drop in the hot fluid within the mixing chamber 24.

A hollow cylindrical valve member 32 is slidably mounted within the mixing chamber 24 and has a longitudinal axis coinciding with the axis defined by the mixing chamber 24. One end of the cylindrical valve member 32 is open to permit the flow of fluid therein and is engageable with the circular wall 26 of the main casing 10 which serves as a seat therefor. The opposite end of the cylindrical valve member 32 has three spaced finger portions 34, each of which is bent to extend perpendicularly toward the longitudinal axis of the valve member 32. The ends of the finger portions 34 coact to define a substantially circular opening through which a power element later to be described partially extends. The spaces between the finger portions 34 permit flow of fluid through the cylindrical valve member 32 and out the tempered fluid outlet 18.

Mounted within the cylindrical valve member 32 and concentric therewith is a thermostatic actuating device 38 for moving the valve member 32 between open and closed positions relative to the wall 26 in response to temperature variations. The thermostatic actuating device is of the conventional form having a relatively fixed end 40, a movable unit 42 and an expansible fusible material (not shown) disposed within and in communication with the movable unit 42. Any suitable fusible material which will give a large volumetric charge on passing from the solid to the liquid state at a predetermined temperature may be used, and since these devices are well known in the art, further description is deemed unnecessary.

The movable unit 42 engages the finger portions 34 of the cylindrical valve member 32 and has a pintle 43 extending through the opening defined by the finger portions 34 to axially align the thermostatic actuating device 38 with the cylindrical valve member 32. The fixed end 40 of the thermostatic actuating device 38 is attached to an end of an adjusting screw 44 which is axially aligned with the mixing chamber 24. The opposite end of the adjusting screw 44 has a threaded portion 46 which is received in the tubular portion 28 of the wall 26. Rotation of the adjusting screw 44 will cause axial movement thereof to vary the position of the thermostatic actuating device 38 with respect to the main casing 10.

The cylindrical valve member 32 defines an annular chamber 48 between the periphery thereof and the main casing 10. The cold fluid inlet 14 is connected to the chamber 48 by a throat 50. Thus, it can be seen that cold fluid will flow through the inlet 14 and throat 50 to the annular chamber 48. The cylindrical valve member 32 acts as a wall between the annular chamber 48 and the mixing chamber 24 when in the position shown. If the valve member 32 should be moved toward the mixed outlet 18, the end thereof will no longer be engaging the wall 26, and fluid will flow from the annular chamber 48 to the mixing chamber 24.

A spring 52 is provided to bias the valve member 32 to the wall 26. The spring 52 encircles the periphery of the cylindrical valve member 32 and has one end engaging the end portion 20 of the end casing 16 and the opposite end engaging a circular ring 54 attached to the cylindrical valve 32. When the end casing 16 is attached to the main casing 10, the spring 52 is compressed and serves to bias the cylindrical valve 32 toward the wall 26.

In the operation of the device, the hot fluid inlet 12 is connected to a source of hot fluid such as an outlet of a hot water tank. The cold fluid inlet 14 is connected to a source of cold fluid and the tempered fluid outlet 18 is connected to a system requiring tempered fluid.

The hot fluid enters by the hot fluid inlet 12 and flows through the orifices 30 in the wall 26 and into the mixing chamber 24. The orifices 30 cause turbulence in the hot fluid flowing therethrough, and as a result, a turbulent region exists in the fluid behind the wall 26. In accordance with Bernoulli's principle, the orifices 30 also create a region of lower pressure within the mixing chamber 24; thus, the pressure of the fluid within the mixing chamber 24 is less than that of the hot or cold fluid entering through their respective inlets.

The hot fluid flows through the cylindrical valve 32 and around the thermostatic regulating device 38, through the spaces between the finger portions 34 and out the tempered fluid outlet 18. The hot fluid thus heats the thermostatic regulating device 38 causing expansion of the fusible material. Since the fixed end 40 is in engagement with the adjusting screw 44, the unit 42 moves toward the tempered fluid outlet 18 carrying with it the cylindrical valve member 32.

Movement of the cylindrical valve member 32 toward the tempered fluid outlet 18 moves its end out of engagement with the wall 26 to establish an opening between the second chamber 48 and the mixing chamber 24. The dam-like action of the end of the cylindrical valve member 32 permits a turbulent radial flow of cold fluid from the annular chamber 48 to the mixing chamber 24. Since the pressure in the mixing chamber 24 is less than that in the annular chamber 48, a solid ring of turbulent fluid will rush toward the center of the mixing chamber 24 from the angular chamber 48 to mix with the turbulent hot fluid flowing through the orifices 30.

The cold fluid mixed with the hot fluid reduces the temperature of the fluid flowing past the thermostatic regulator 38 and causes contraction of the fusible material and movement of the movable unit toward the hot water inlet 12 and permits the cylindrical valve member 32 to move to a more closed position under the bias of the spring 52. Thus, the thermostatic regulator 38, sensing the mixed temperature of the fluid flowing past it, adjusts the cylindrical valve to control the inspiration of cold fluid which is mixed with the hot fluid to create a relatively constant outlet supply of tempered fluid.

One of the main features of this invention is the cylindrical valve construction. It can be seen that the cylindrical valve 32 will allow a large volume of cold fluid to flow into the mixing chamber 24 when moved a short distance, thus making the control much more sensitive and accurate in controlling temperature than a mixing device employing poppet valves. The cylindrical construction also permits close proximity of the valve to a low pressure region without valve pulse or flutter.

Another feature of the invention is the use of the orifices 30 to create a region of lower pressure within the mixing chamber 24 to increase the flow of cold fluid from the second chamber 48 to the mixing chamber 24. The orifices 30 also provide for better mixing within the mixing chamber by causing turbulence in the flow of hot fluid. Since the end of the cylindrical valve member 32 also causes turbulence in the cold fluid flowing into the mixing chamber 24, mixing of the hot and cold fluid in the mixing chamber 24 is assured and a thoroughly mixed fluid flows past the thermostatic regulator 38 and through the outlet 18.

Although a preferred embodiment of this invention has been shown and described herein, it is to be understood that the invention is not limited to the details of construction and arrangement of parts disclosed but is to be interpreted as claimed.

It is claimed and desired to secure by Letters Patent:

1. In a mixing valve for hot and cold fluid, the combination comprising a casing having a mixing chamber with an inlet and an outlet for fluid, a wall extending inwardly of said inlet, said casing having an annular chamber with an opening for fluid circumscribing said mixing chamber, a cylindrical member separating said mixing chamber and said annular chamber, means urging said cylindrical member into engagement with said wall, said cylindrical member being movable between controlling positions and adapted to permit a turbulent radial flow of fluid from said annular chamber to said mixing chamber when in one of said controlling positions, thermally responsive means including a movable member within said casing, said movable member being operatively connected to said cylindrical member to effect movement thereof in response to temperature variations, and a plurality of ports within said wall for causing a low pressure area in the fluids flowing through said mixing chamber to increase the flow of fluid from said annular chamber to said mixing chamber, said ports and the fluid flow from said annular chamber causing turbulence in the fluids within said mixing chamber to insure thorough mixing.

2. In a mixing valve for hot and cold fluid, the combination comprising a casing having a mixing chamber with an inlet and an outlet for flow of fluid through said mixing chamber, said casing having a second chamber with an inlet for fluid circumscribing said mixing chamber, a wall extending inwardly of said mixing chamber inlet, a cylindrical valve member separating said mixing chamber and said second chamber, said valve member being movable axially between controlling positions and adapted to permit a turbulent radial flow of fluid from said second chamber to said mixing chamber when in one of said controlling positions, means for biasing said valve member into engagement with said wall in one of said controlling positions, thermally responsive means including a movable element in said mixing chamber, said movable element being operatively connected to said valve member for transmitting movement therebetween in response to variations in temperature of the fluid flowing through said mixing chamber, and a constriction in the wall in the inlet of said mixing chamber for causing a pressure drop in a fluid flowing through said mixing chamber to increase the flow of fluid from said second chamber to said mixing chamber, said constriction being adapted to cause turbulence in the flow of fluid through said mixing chamber.

3. A mixing valve as claimed in claim 2 wherein said constriction comprises a wall having a plurality of orifices therein.

4. A mixing valve as claimed in claim 2 wherein said wall in the mixing chamber inlet is adapted to provide a seat for said valve member.

5. In a mixing valve for hot and cold fluids, the combination comprising a casing having a chamber with first and second inlets and an outlet therefrom, thermally responsive valve means including a movable valve member for controlling the flow of fluid through the second of said inlets, a wall extending inwardly of the first of said inlets, means for urging said movable valve member into engagement with said wall, and a plurality of ports in said wall for causing a region of lower pressure in the fluids flowing through said chamber to increase the flow of fluid through said second inlet, said ports causing turbulence in the fluids flowing through said chamber to insure thorough mixing.

6. In a mixing valve for hot and cold fluids, the combination comprising a casing having a chamber with first and second inlets and an outlet therefrom, a thermally responsive means including a movable member within said chamber, a valve member operatively connected to said movable member for controlling the flow of fluid through the second of said inlets, a wall extending inwardly of the first of said inlets, means urging said valve member into engagement with said wall, and a fixed constriction associated with said wall for causing turbulence in said chamber to insure thorough mixing, said fixed constriction also being adapted to cause a low pressure area in the fluids flowing through said chamber to increase the rate of fluid flow through said second inlet.

7. In a mixing valve for hot and cold fluids, the combination comprising a casing having a chamber with a first inlet and an outlet for flow of fluid through said chamber and a second inlet for admitting fluid from another source into said chamber, thermally responsive means including a movable member within said chamber, a cylindrical valve member within said casing and operatively connected to said movable member for controlling the fluid flow through said second inlet, a wall extending inwardly of said first inlet, means urging said cylindrical valve member into engagement with said wall, an orifice in said wall for causing a pressure drop in a fluid flowing through said chamber to increase the rate of fluid flow through said second inlet, said orifice and the flow of fluid through the second inlet causing turbulence in said mixing chamber to insure thorough mixing.

8. In a mixing valve for hot and cold fluids comprising a casing, a mixing chamber and an annular chamber in said casing, a valve member slidably mounted in said casing separating said mixing chamber and said annular chamber, an opening in said annular chamber, said mixing chamber having first and second inlets and an outlet therefrom, a wall extending inwardly of the first of said inlets, means normally urging said valve member into engagement with said wall, thermally responsive means in said mixing chamber including a movable member, said movable member operatively connected to said valve member to move said valve member out of engagement with said wall, thereby defining the second of said inlets in the mixing chamber, a plurality of ports in said wall causing a low pressure area in the fluids flowing through said mixing chamber to increase the rate of fluid flow through the second of said inlets, said ports and the flow of fluid through the second of said inlets causing turbulence in the mixing chamber to insure thorough mixing of the fluids.

References Cited in the file of this patent

UNITED STATES PATENTS

| | | |
|---|---|---|
| Re. 19,488 | Russell | Mar. 5, 1935 |
| 2,326,096 | Dillman | Aug. 3, 1943 |
| 2,628,781 | Cantalupo | Feb. 17, 1953 |
| 2,676,575 | Rosenberger | Apr. 27, 1954 |

FOREIGN PATENTS

| | | |
|---|---|---|
| 773,505 | France | Sept. 3, 1934 |